Jan. 2, 1968   R. F. GERM   3,360,829
MOLD TO ELIMINATE FLASH FROM PLASTIC PARTS
Filed Dec. 14, 1964   2 Sheets-Sheet 1

INVENTOR.
RAYMOND F. GERM
BY
Charles L. Lovercheck
attorney

Jan. 2, 1968 R. F. GERM 3,360,829
MOLD TO ELIMINATE FLASH FROM PLASTIC PARTS
Filed Dec. 14, 1964 2 Sheets-Sheet 2

INVENTOR.
RAYMOND F. GERM
BY
Charles L. Lovercheck
attorney

United States Patent Office 3,360,829
Patented Jan. 2, 1968

3,360,829
MOLD TO ELIMINATE FLASH FROM PLASTIC PARTS
Raymond F. Germ, Mentor, Ohio, assignor to Continental Rubber Works, Erie, Pa., a corporation of Pennsylvania
Filed Dec. 14, 1964, Ser. No. 418,243
8 Claims. (Cl. 18—42)

ABSTRACT OF THE DISCLOSURE

There has been a problem in molding apparatus of this type in molding parts without a flash of material resulting from rubber and other plastic entering the parting line between the mold parts around the edges thereof. Various attempts have been made to eliminate the formation of this flash. For example, in Patent No. 2,883,704, a flexible plate was provided which flexed during injection of the material so that its edges engaged. The present invention provides a means for supporting one mold part on spherical members at the center of the end thereof opposite the end to which pressure is applied. These could also be the same member. These spherical parts allow the two mold parts to engage each other along their parting line so that they may adjust themselves together and make intimate contact along a line which would otherwise define a flash on the molded part and so that no flash can form.

This invention relates to molds and, more particularly, to apparatus for the injection and transfer molding of parts in multi-cavity molds as well as in individual molds.

It is, accordingly, an object of the present invention to provide an improved injection or transfer mold.

Another object of the invention is to provide a mold wherein the mold parts are supported in such a way that the parts may adjust themselves to each other along a parting line.

A further object of the invention is to provide an injection mold which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
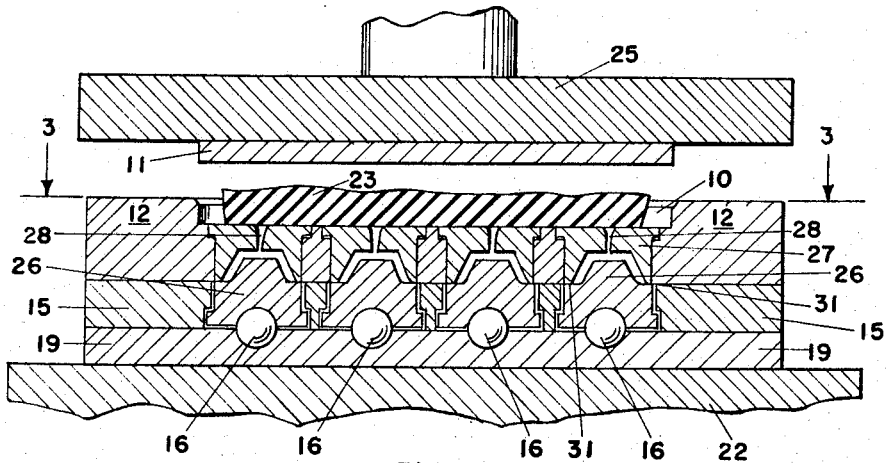
FIG. 1 is a longitudinal cross sectional view of a mold according to the invention.
Figure 2:
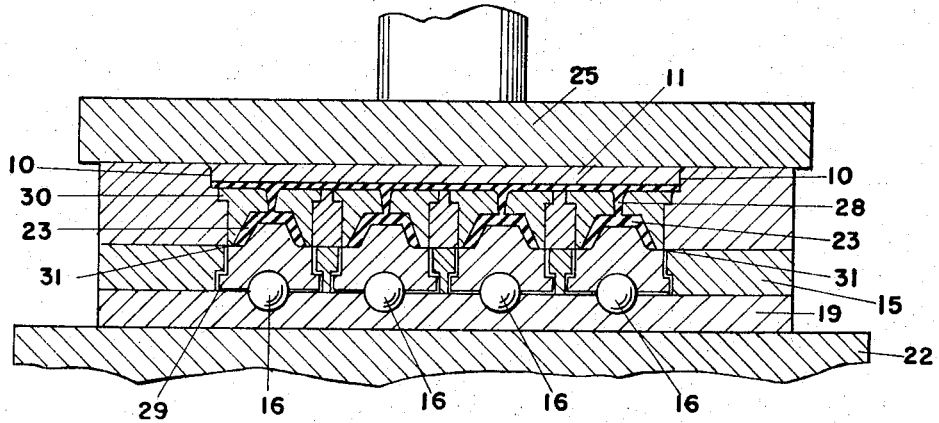
FIG. 2 is a view similar to FIG. 1 showing rubber forced into the molds and a plunger moved into the mold cavity.
Figure 3:
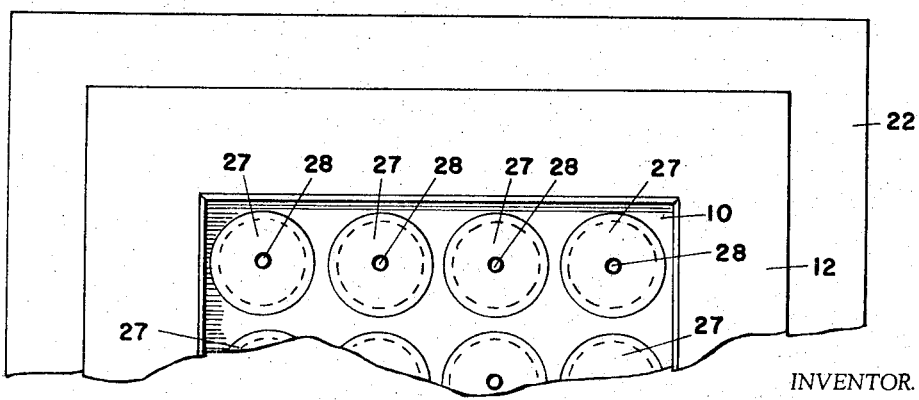
FIG. 3 is a cross sectional view taken on line 3—3 of FIG. 1.

Now with more particular reference to the drawings, the mold may be supported on a conventional press having a fixed frame with an upper platen 25 and a lower platen 22 fixed relatively to each other. The platen 22 may be considered to be the anvil of the press. The press has an upper platen 25 attached to its ram and, to this, the piston plunger 11 is attached.

The mold is made up of the upper retainer plate 12, lower retainer plate 15, and bottom plate 19 and they provide an enclosure for the mold parts 26 and 27. Plates 15 and 19 may be bolted together. The mold parts 26 and 27 may be in the form of cylinders or any other suitable shape supported in suitable bores in the retainer plates 12 and 15 as shown. A cavity or pot 10 is provided in the upper retainer plate 12 which receives plastic material 23 and into which the plunger 11 enters so that the plastic material 23 may be forced through sprue openings 28 into the cavities defined between the mold parts 26 and 27.

The upper retainer plate 12 has the spaced bores which receive the upper mold parts 27 with counterbores which receive the flanges 30. The tops of the mold parts 27 form part of the bottom of pot 10.

The lower mold parts 26 are in the form of cylinders or other shapes that have peripheral flanges 29 on their lower ends. The flanges are received in circular counterbores in the bottom of the bores in the lower retainer plate 15 and the upper mold parts have flanges 30 which are received in counterbores of the bores in the upper retainer plate 12. The upper mold parts 27 are fairly snugly received in the upper retainer plate 12 while the lower mold parts 26 are loosely received in the bores in the lower retainer plate 15 so that the lower mold parts 26 can rock on the spheres 16 and thereby adjust themselves so that the two mold parts 26 and 27 intimately engage each other along the parting line 31. Thus, since the lower mold parts 26 can rock on the sphere 16, the mold parts will intimately engage and the parting line 31 will be completely sealed and therefore no fish will result on the molded parts.

Figure 4:
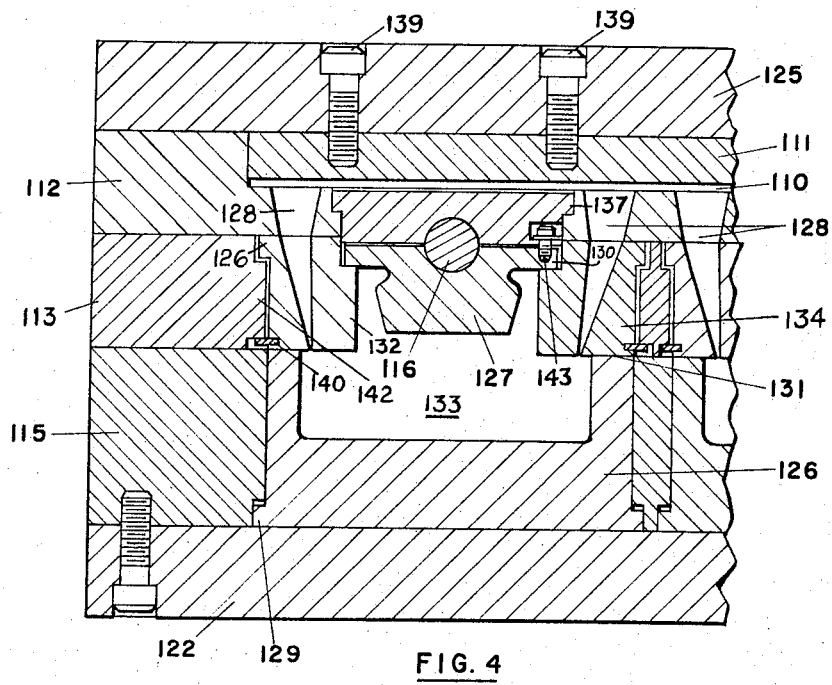
FIG. 4 is a longitudinal cross sectional view of another embodiment of the invention.

The mold in the embodiment of the invention shown in FIG. 4 may be supported on a conventional press having a fixed frame and an anvil and a ram.

The platen 122 may be supported on the press anvil, and to this is fixed the lower retainer plate 115, the center plate 113, and the upper retainer plate 112. The upper retainer plate has a pot 110 therein. The plate 125 may be fixed to the press ram and to this is fixed the piston 111 by means of studs. The piston is received in the pot 110.

The plate 132 has an outwardly extending flange 126 on the upper side thereof and a snap ring 140 on the lower end, which ars disposed on each side of a flange 142 on the plate 113. This allows the plate 132 to float.

The sprues 128 receive rubber material from the pot 110 and conduct it to the mold chamber 133. The mold parts 127 and 137 are held together by screws 143 and can work relative to each other on spheres 116. It will be noted that the screws extend from the member 137 and engage the flange 130 on the members 127.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A mold comprising
    a bottom plate,
    a lower retainer plate supported on said bottom plate,
    an upper retainer plate supported on said lower retainer plate,
    said upper retainer plate having a pot in the form of a cavity therein,
    a ram piston adapted to be forced into said pot,
    a cylinder bore in said upper plate and a cylinder bore in said lower plate, a lower mold part in said lower plate bore aligned with an upper mold part in said upper plate bore and engaging said upper piston along a parting line, one of said mold parts having a cavity therein, a sprue opening in one said mold part communicating with said cavity and said pot, and means supporting said lower mold part at an intermediate part thereof on said lower plate to enable said lower mold part to rock on said means supporting it whereby said upper and lower mold parts can align themselves and come into intimate contact with each other along said parting line.

2. A mold comprising a bottom plate, a lower retainer plate supported on said bottom plate, an upper retainer plate supported on said lower retainer plate, said upper plate having a pot in the form of a cavity therein, a ram piston adapted to be forced into said pot, a cylinder bore in said upper plate and a cylinder bore in said lower plate, a lower mold part in said lower plate bore aligned with an upper mold part in said upper plate bore and engaging said upper piston along a parting line, one of said mold parts having a cavity therein, a sprue opening in one said mold parts communicating with said cavity and said pot, means supporting said lower mold part at an intermediate part thereof on said lower plate whereby said lower mold part can rock on said means supporting it and said upper and lower mold parts can align themselves and come into intimate contact with each other along said parting line, said means supporting said lower mold part comprises a spherical member received in cavities in said lower mold part and in said lower retaining plate whereby the lower end of said lower mold part is held in spaced relation to the said lower retaining plate.

3. A mold comprising a bottom plate, a lower retainer plate supported on said bottom plate, an upper retainer plate supported on said lower retainer plate, said upper retainer plate having a pot in the form of a cavity therein, a ram piston adapted to be forced into said pot, a cylindrical bore in said upper plate and a cylindrical bore in said lower plate, a lower mold part in said lower plate bore aligned with an upper mold part in said upper plate bore and engaging said upper mold part along a parting line, one of said mold parts having a cavity therein inward of said parting line, a sprue opening in one said mold part communicating with said pot, and means supporting said lower mold part on said lower retainer plate at an intermediate part of said lower part to enable said lower mold part to rock on said means supporting it whereby said upper mold part and said lower mold part can align with each other along a said parting line.

4. A mold comprising a bottom plate, a lower retainer plate supported on said bottom plate, an upper retainer plate supported on said lower retainer plate, said upper retainer plate having a pot in the form of a cavity therein, a ram piston adapted to be forced into said pot, a cylindrical bore in said upper plate and a cylindrical bore in said lower plate, a lower mold part in said lower plate bore aligned with an upper mold part in said upper plate bore and engaging said upper mold part along a parting line, one of said mold parts having a cavity therein inward of said parting line, a sprue opening in one said mold part communicating with said pot, and means supporting said lower mold part on said lower retainer plate at an intermediate part of said lower mold part whereby said lower mold part can rock on said means supporting it and said upper and lower mold parts can align with each other along a said parting line, said means supporting said lower mold part comprises a spherical member received in cavities in said lower mold part and in said lower retaining plate whereby the lower end of said lower mold part is held in spaced relation to the said lower retaining plate.

5. A mold comprising a first and a second mold part having a cavity therebetween and engaging each other around a peripheral margin around said cavity defining a parting line, first support means engaging said first part on one end substantially at the center thereof at a localized position to enable said first part to rock relative to said second part to align itself therewith, and second support means for exerting a force on the end of said second mold part opposite said means engaging said first mold part whereby said parts are urged together, means to inject material to be molded into said cavity, said first and second support means being adapted to transmit said forces to said first and second parts to force said mold parts together along said margin.

6. A mold comprising a retainer member, a bore in said retainer member, a first and a second mold part disposed in said bore in end to end relation, one of said mold parts defining a cavity therebetween with the outer edges thereof making sealing engagement with each other, means to inject material to be molded into said cavity, and means comprising a spherical member engaging said second mold part at the end thereof and at the axial center thereof remote from said means to inject material thereinto whereby said mold parts may move laterally relative to each other.

7. A mold comprising a bottom plate, a lower retainer plate supported on said bottom plate, an upper retainer plate supported on said lower retainer plate, said upper retainer plate having first mold parts supported thereon, sprue holes in said first mold parts, an upwardly facing cavity in said upper retainer plate communicating with said sprue holes, a plunger adapted to move into said cavity and to fit therein and force material to be molded into said sprue holes, said retainer plate being in the form of an open frame, a plurality of cavities formed in said bottom plate, a plurality of cavity plates in said retainer plate having cavities therein connected to said sprue holes, a plurality of upwardly facing hemispherical openings in said bottom plate of less depth than the radius thereof, a plurality of downwardly facing hemispherical openings in said cavity plates over said openings in said bottom plates, a spherical member in each said opening of substantially the same radius as said openings and holding said cavity plates in spaced relation to said bottom plate whereby said cavity plate is deflected around said spheres when said plunger compresses rubber in said cavity.

8. A mold comprising a bottom plate, a retainer plate having a cavity, means supporting said retainer plate on said bottom plate and, enclosing a first and second mold part in said retainer plate, a plunger operatively associated with said first mold part for forcing plastic material into said cavity in said retainer plate, said means supporting said mold part in said cavity comprising a further means disposed between said second mold part and said bottom plate and supporting said second mold part at an intermediate part thereof to enable said second mold part to rock around said further means into engagement with said bottom plate.

References Cited

UNITED STATES PATENTS

| | | | |
|---|---|---|---|
| 2,568,771 | 9/1951 | Smith | 18—30 |
| 2,894,284 | 7/1959 | Allison et al. | 18—30 |
| 3,121,918 | 2/1964 | Jurgeleit | 18—30 |
| 3,132,381 | 5/1964 | Bowen. | |
| 3,150,413 | 9/1964 | Zeitlin et al. | 18—16.5 |

J. HOWARD FLINT, JR., *Primary Examiner.*